(12) United States Patent
Kaftan et al.

(10) Patent No.: US 9,842,413 B2
(45) Date of Patent: Dec. 12, 2017

(54) METHOD AND APPARATUS FOR CALIBRATION OF MEDICAL IMAGE DATA

(71) Applicant: Siemens Medical Solutions USA, Inc., Malvern, PA (US)

(72) Inventors: Jens Kaftan, Oxford (GB); Matthew David Kelly, Botley (GB); Julien Michel Yvon Willaime, Marston (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 77 days.

(21) Appl. No.: 14/731,792

(22) Filed: Jun. 5, 2015

(65) Prior Publication Data

US 2015/0356754 A1 Dec. 10, 2015

(30) Foreign Application Priority Data

Jun. 6, 2014 (GB) .................................. 1410080.4

(51) Int. Cl.
*G06T 11/00* (2006.01)
*G06T 5/00* (2006.01)
*G06T 5/10* (2006.01)
*G06T 7/00* (2017.01)
*G06T 5/20* (2006.01)

(52) U.S. Cl.
CPC ............ *G06T 11/005* (2013.01); *G06T 5/003* (2013.01); *G06T 5/10* (2013.01); *G06T 5/20* (2013.01); *G06T 7/0014* (2013.01); *G06T 11/008* (2013.01); *G06T 2207/10104* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 5,450,461 A | * | 9/1995 | Hsieh ..................... | A61B 6/032 378/19 |
| 2006/0285634 A1 | * | 12/2006 | Toth ....................... | A61B 6/488 378/16 |
| 2010/0290680 A1 | | 11/2010 | Declerck et al. | |

(Continued)

OTHER PUBLICATIONS

Kelly et al., "SUVref: reducing reconstruction-dependent variation in PET SUV," EJNMMI Research (2011).

(Continued)

*Primary Examiner* — Matthew Bella
*Assistant Examiner* — Brian Shin
(74) *Attorney, Agent, or Firm* — Schiff Hardin LLP

(57) ABSTRACT

In a method and apparatus for providing a visualization image and a reference image for a patient, with only one reconstruction being implemented, raw scan data from the patient are reconstructed into a visualization image, and the reference image is generated, without another reconstruction, by applying a filter to the visualization image to obtain a simulated reference image, using a value of a filter parameter that is specific for the patient. The patient-specific filter parameter is determined by comparing image-derived properties of an accessed, previously-reconstructed reference image and the reference image, and the filter parameter is adapted to reduce differences in the image-derived properties of the respective images.

8 Claims, 6 Drawing Sheets

(56) References Cited

U.S. PATENT DOCUMENTS

2013/0329974 A1 12/2013 Kelly et al.
2013/0329975 A1 12/2013 Kelly et al.

OTHER PUBLICATIONS

Boellaard et al., "FDG PET and PET/CT: EANM procedure guidelines for tumour PET imaging: version 1.0," European Journal of Nuclear Medicine Molecular Imaging, vol. 37, pp. 181-200 (2010).
Lasnon et al., "Harmonizing SUVs in multicentre trials when using different generation PET systems: prospective validation in non-small cell lung cancer patients," European Journal of Nuclear Medicine Molecular Imaging (2013).
Joshi et al., "Reducing between scanner differences in multi-center PET studies," NeuroImage, vol. 46, pp. 154-159 (2009).

\* cited by examiner

METHOD AND APPARATUS FOR CALIBRATION OF MEDICAL IMAGE DATA

BACKGROUND OF THE INVENTION

Field of the Invention

The present invention is directed to a method and apparatus for calibrating image data from a given medical imaging protocol.

Description of the Prior Art

In the medical imaging field, several imaging schemes are known. For example PET (Positron Emission Tomography) is a method for imaging a subject in 3D using an injected radio-active substance which is processed in the body, typically resulting in an image indicating one or more biological functions.

The Standardized Uptake Value (SUV) is a widely-used measure for quantifying radiotracer (especially 18F-FDG) uptake in clinical PET scans. This value is computed from the number of counts of emission events recorded per voxel in the image reconstructed from event data captured in the PET scan. Its use is intended to provide normalization for differences in patient size and body composition, along with the dose of radiotracer injected, thereby enabling inter-study comparison, both between and within individual patients.

While raw scan data may be expressed in units of Bq/ml, SUV is calculated as:

$$\frac{\text{scan data (in } Bq/\text{ml}) \times \text{patient mass (in grammes)}}{\text{total injected dose (in } Bq)}$$

This is typically simplified by assuming that the patient has a density of 1 g/ml, in which case the SUV becomes dimensionless.

SUVmax is the maximum observed value of SUV within a region of interest: typically a three-dimensional volume of interest, for example a representation of a lesion.

While differences in body composition and injected dose represent one source of variation, differences in scanner hardware and reconstruction software represent others, and these are not addressed by the use of SUV.

It has been observed that a single set of raw scan data may result in differing values for SUV, and so also for SUVmax, depending on the reconstruction applied to the raw scan data. A "reconstruction", in this context, is the treatment applied to a digital photon count to convert it into image data. Practically, it is carried out by a digital computer. For example, a low resolution reconstruction will result in significant "blurring" of the image produced, so that a small lesion may appear to have a lower SUVmax than in reality, while a larger lesion of a same SUV will appear to have a larger, and possibly correct, SUVmax. Using a higher-resolution reconstruction on the same raw data will show images with more clearly-defined edges, in turn meaning that small lesions will appear to have greater SUVmax than under the lower-resolution reconstruction. SUVmax is typically the clinically-reported result of a scan.

It is clearly undesirable for the results of the PET scan to vary according to the reconstruction applied. For example, it may be required to evaluate a patient's progress by comparing two PET scan results taken at different times on different scanners. Each may have a different reconstruction, for example because a newer scanner has a higher resolution capacity. However, the two results must be aligned, that is, made comparable.

The described variations in reported results impede the acceptance of PET as a quantitative imaging tool for lesion characterization, prognostic stratification and treatment monitoring, since differences in scanner hardware and reconstruction can significantly impact generated SUV values. As such, better standardization and improved comparability between scanners and reconstruction protocols are required.

Two reconstructions may be performed on each data set. Typically, this will include one high-resolution reconstruction for visualization, whereby a user may be presented with an image of high quality for visual consideration, while a second lower-quality reconstruction is also performed to provide an image of a standard reference quality to enable it to be compared to images produced by lower-resolution scanners. Effectively, higher-quality image data is blurred or downgraded to provide an image of standard resolution for quantification, allowing the results from a high-resolution scanner to be compared to results from lower-resolution scanners. The higher-quality image is preferably made available for visualization by a user.

U.S. Pat. No. 8,755,574 and the equivalent GB2469569 address this situation, and provide for image calibration by reference to a reference object. This may be a standard "phantom", such as a NEMA image quality phantom, well known in the art. Imaging of such a reference object allows recovery coefficients of the imaging system to be determined as the characteristics of the phantom are known a priori.

U.S. Pat. No. 8,755,574 and the equivalent GB2469569 describe methods for calibrating image data from a given medical imaging protocol, in particular for aligning PET images acquired using a "preferred" reading reconstruction-protocol to a "reference" reconstruction-protocol. The procedure relies on a phantom calibration step whereby an optimal filter size, which aligns data reconstructed using the "preferred" protocol to a "reference" reconstruction protocol, is estimated. The procedure is based on minimizing the differences in activity concentration recovery coefficients (RCs) calculated from a filtered version of the phantom data reconstructed with the "preferred" protocol and a reference RC curve. The filter that best aligns the RCs can then be used to align clinical PET data acquired using the "preferred" protocol to the "reference" protocol. The "preferred" reconstruction protocol is aimed at image visualization, whereas data aligned to the "reference" reconstruction-protocol (not visible to the user) is used for quantification.

The known method includes: (a) obtaining reference image data from a scan of a reference object using the medical imaging protocol; comparing the obtained reference image data of the reference object to standard reference image data for the reference object, and modifying the obtained reference image data to reduce an error between the obtained reference image data and the standard reference image data; and (b) obtaining subject image data from a scan of a subject using the medical imaging protocol, modifying the subject image data based on the modified reference image data, and obtaining from the modified subject image data a value of a variable for display with unmodified subject image data.

It is necessary to perform at least one phantom scan per phantom model on each scanner; and once for each reconstruction. It has been found to be inconvenient to have to rely on imaging a reference article, such as a phantom. In a real-life clinical setting, a suitable phantom may not be readily available. It is not a trivial task to prepare an imaging phantom for scanning, or to perform the required reconstruction of scan data. A clinical environment may lack the materials, expertise and time to perform phantom scanning for image data calibration.

SUMMARY OF THE INVENTION

The present invention accordingly aims to provide methods and apparatus for calibration of medical image data which does not require the use of an image phantom.

As such, the invention is particularly applicable to the multiple reconstruction of PET scan data into one high-resolution image for viewing and a second, lower-resolution image for quantification.

In accordance with the invention, scan image data are reconstructed for visualization and for quantification by reconstructing scan image data using a first reconstruction protocol into a visualization image, and then applying a filter to the visualization image so as to obtain a simulated reference image for quantification. A value of a filter parameter is provided to the filter. The value of the filter parameter is obtained by providing an initial value of the filter parameter to the processor in which the scan image data are reconstructed, reconstructing the scan image data using a second reconstruction protocol so as to produce a reference image suitable for quantification;

Comparing image-derived properties of the reference image and the simulated reference image, adapting the value of the filter parameter according to a result of the comparison, the adaptation being implemented to reduce differences in the image-derived properties of the simulated reference image with respect to the reference image, and the adapted value of the filter parameter is electronically stored.

The following prior art documents discuss background technology which may assist the understanding of the present invention:

Boellaard, R., O'Doherty M. J., Weber, W. A. et al (2009) FDG PET and PET/CT: EANM procedure guidelines for tumour PET imaging: version 1.0, Eur. J. Nucl. Med. Mol. Imaging, 37: 181-200.

Lasnon, C. Desmonts, C., Quak, E. et al (2013) Harmonizing SUVs in multicentre trials when using different generation PET systems: prospective validation in non-small cell lung cancer patients, Eur. J. Nucl. Med. Mol. Imaging, 40(7), 985-996.

Joshi, A., Koeppe, R. A. and Fessler, J. A. (2009) Reducing between scanner differences in multi-center PET studies, NeuroImage, 46, 154-159.

Kelly, M. D. and Declerck, J. M. (2011) SUVref: reducing reconstruction-dependent variation in PET SUV, EJNMMI Research 1:16.

DESCRIPTION OF THE PREFERRED EMBODIMENTS

According to an aspect of the present invention, calibration of patient scan image data is calibrated by reference to existing patient scan images, rather than to a reference object such as a phantom.

In certain embodiments of the present invention, an image-based calibration method is provided, to calculate an optimal filter size required to align scan image data reconstructed with a "preferred" protocol to a "reference" protocol by using existing clinical scan image datasets available at clinical sites, without requiring a phantom calibration step. The image-based calibration procedure is enabled by a user who specifies both the "preferred" and "reference" reconstruction parameters. Subsequently, scan image data for each new patient is reconstructed using both sets of reconstruction parameters. The filter size (e.g. Gaussian kernel size), which aligns best the patient data reconstructed with the "preferred" protocol to the corresponding "reference" data, is computed using image-derived properties such as voxel-by-voxel RMS error. In certain embodiments, such filter sizes are determined for several patients, and an optimal filter for the pair of "preferred" and "reference" reconstructions is estimated across all sets of patient data. This may be by simple averaging of all optimal filter sizes. Preferably, a workflow provided by the present invention includes a stopping criterion for the inclusion of new patients such that, once an acceptably stable optimal filter size is derived, no further filter sizes for individual patients are taken into account. The optimal filter size can then be used to align clinical scan image data reconstructed using the "preferred" protocol to the "reference" protocol.

Figure 1:
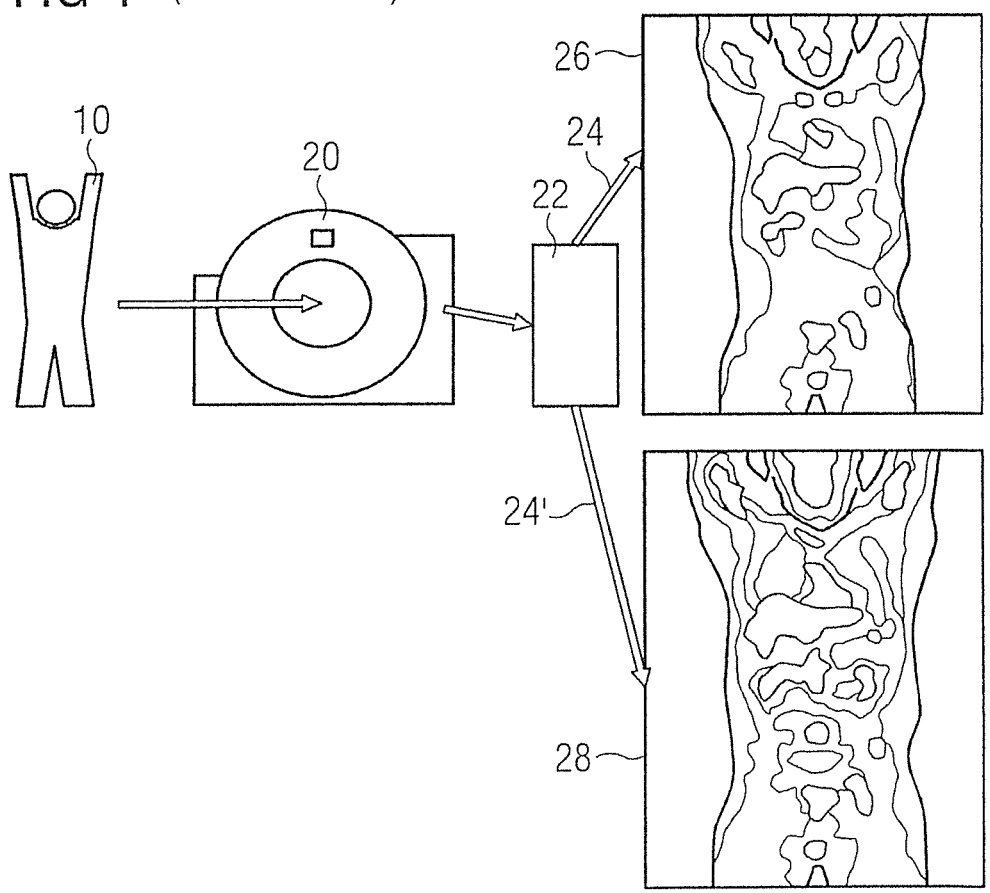
FIG. 1 schematically shows a flowchart of steps involved in a method for generating visualization and reference images from a single scan data set.

FIG. 1 schematically shows a flowchart of steps involved in a method susceptible to improvement according to an embodiment of the present invention.

A patient 10 is scanned in a scanner 20, for example a PET scanner. This generates a set of raw scan data 22. The raw scan data 22 is not viewable until it has been reconstructed in a reconstruction step 24, 24'. An appropriate set of parameter settings, itself known as a "protocol", will be applied in the respective reconstruction step.

In a first reconstruction step 24, a "preferred" protocol is applied, and a visualization image 26 is produced.

A second reconstruction step 24' is also performed on the same set of raw scan data 22. A "reference" protocol is specified by a user in order to reconstruct a reference image 28.

The appropriate protocol for use in the second reconstruction step 24' is specified by a user. It can, for instance, be a reconstruction protocol previously used to reconstruct image data from an older scanner, or a protocol known to produce images that closely match a proposed standard.

The reference image 28 is preferably of a standard resolution, for example as discussed in U.S. Pat. No. 8,755,574 and the equivalent GB2469569, to enable comparisons between image data generated by apparatus of different resolution capabilities.

The reference image 28 is known to be useful for quantification, while the visualization image 26 is preferred for visual interpretation by a user.

It is, however, desired to avoid the need to perform two separate reconstruction steps 24, 24' on each set of raw scan data 22. With present technology, each reconstruction takes about two minutes per bed position. With typically about 7 bed positions per scan, the reconstruction process takes about the same time again as the actual scanning. It also requires more administration and diligence for a user to maintain pairs of completely separate reconstructions and images 26, 28 for each scan.

Figure 2:
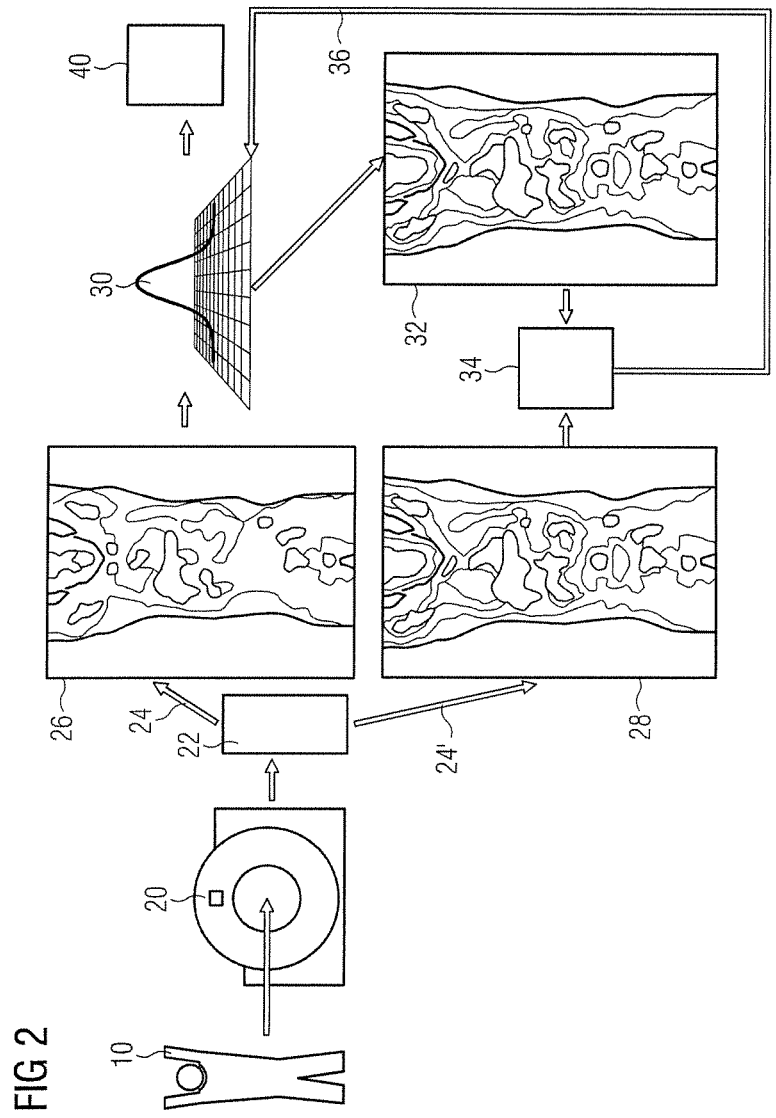
FIG. 2 schematically shows a flowchart of steps involved in a method according to an embodiment of the present invention.

Accordingly, embodiments of the present invention provide the further steps 30-40 illustrated in FIG. 2. A filter 30 is applied to the image data used to generate the visualization image 26. Filter 30 may be a Gaussian filter of size $\sigma_p$. It will be unique to the individual patient 10 in question, as will be discussed in further detail below.

The output of filter 30 acting on visualization image 26 is a simulated reference image 32

The step of filtering preferably comprises convolving with an image filter variable according to a given factor. The image filter may be a Gaussian filter. The factor may be the full width at half maximum of a Gaussian filter.

A comparison step 34 performs a voxel-wise RMS error comparison between the reference image 28 and the simulated reference image 32. An output 36 of this comparison step is provided to the filter 30 in a feedback loop. The size $\sigma_p$ of the Gaussian filter 30 may start at zero, and is adjusted in accordance with the output 36 of the voxel-wise RMS error comparison 34. The adjusted Gaussian filter 30 is then applied to the visualization image 26 to reduce voxel-wise RMS error between reference image 28 and simulated reference image 32. This may be in a distinct step, or may be a real-time adjustment of parameters in the filter 30.

This feedback 36 of voxel-wise RMS error to control parameters of the filter 30, such as its size $\sigma_p$, continues until the reference image 28 and the simulated reference image 32 are sufficiently similar that the measured voxel-wise RMS error indicated by output 36 is minimized.

Once the reference image 28 and the simulated reference image 32 are sufficiently similar, the size $\sigma_p$ of the Gaussian filter 30 is stored in a record 40 unique to the particular patient 10.

Figure 3:
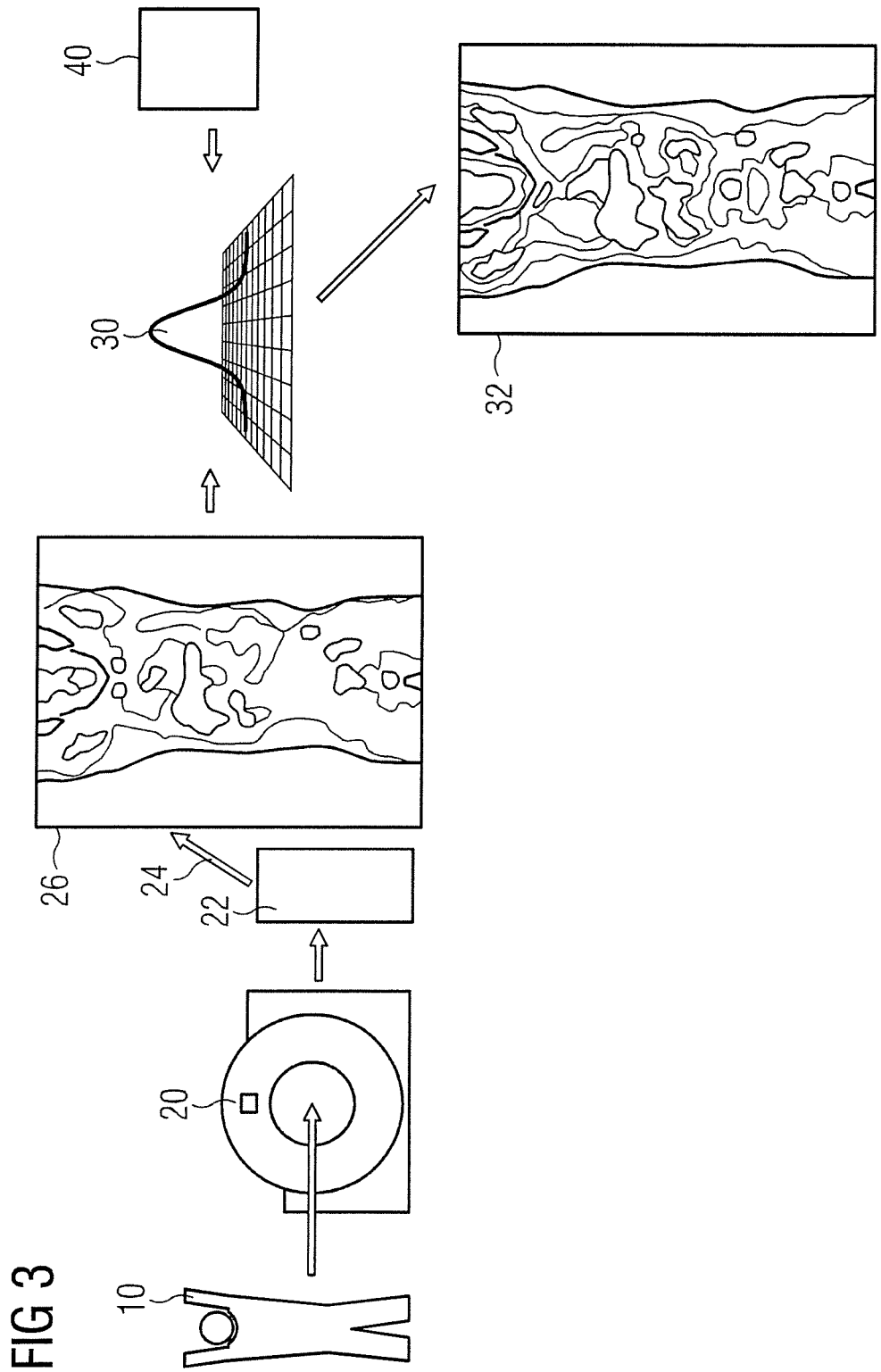
FIG. 3 schematically shows a flowchart of steps involved in a method according to another embodiment of the present invention.

As illustrated in FIG. 3, further sets of raw scan data 22 of the patient 10 need only be reconstructed 24 once, to provide a visualization image 26. The corresponding Gaussian filter size $\sigma_p$ may be retrieved from the record 40 and the corresponding filter 30 applied to the visualization image 26 to create a simulated reference image 32 suitable for quantification.

When a new patient 10 is imaged, the process described is repeated afresh, to store a corresponding size $\sigma_p$ of the Gaussian filter 30 in a corresponding new record 40 unique to the new patient 10.

Preferably, in a set-up phase, a sample of about ten patients may be imaged, and the raw scan data 22 of each may be reconstructed twice 24, 24' as explained with reference to FIG. 1. Corresponding required filter sizes $\sigma_p$ for generation of an acceptable simulated reference image 32 are derived and stored in patient records 40. An average of the filter size records 40 of those patients may be used as the size of filter 30 for application to a visualization image 26 of a new patient in a method as discussed with reference to FIG. 3.

The reconstruction protocol used to generate the first "reference" image 28 may be an existing protocol from an earlier system.

Figure 4:
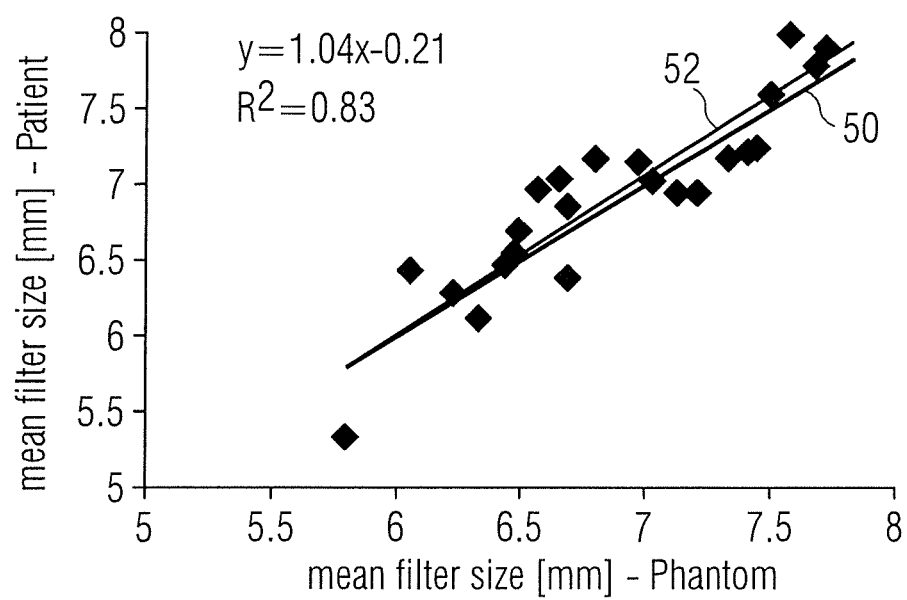
FIG. 4 shows a comparison of results achieved by a calibration method according to the present invention compared to similar results obtained from a known calibration method.

FIG. 4 illustrates results of a comparison exercise showing a comparison between mean filter sizes for particular raw scan data sets calculated by a conventional phantom based method such as described in U.S. Pat. No. 8,755,574 and the equivalent GB2469569, and the method of the present invention.

The data points indicate the corresponding Gaussian filter size in millimeters, calculated as a mean filter size across respective samples of ten repeat scans of a certain phantom or across a sample of ten patients. Line 50 shows the line of unity and line 52 shows the line of linear fit. A very close agreement is observed.

The present invention accordingly provides a method for generating two images from a single set of raw scan data 22: one high-resolution image 26 best for viewing and a lower-resolution image 28 which may be preferred for quantification. Only a single reconstruction is required, however, which generates the visualization image. A filter, such as a Gaussian filter, is derived for each patient based only on patient image data and is applied to the visualization image 26 to generate a corresponding quantification image, as simulated reference image 32.

The estimated filter size $\sigma_p$ is different across patients due to intrinsic variability. However the optimal filter size for a given pair of "preferred"-"reference" reconstruction protocols is unique and may be computed as the mean $\sigma_p$ across a number of patients.

The invention can be used to compare ("quantise") image data obtained from a same scanner, or at least a same type of scanner, even if different reconstruction protocols have been used. All images can be filtered to the quality of the reference image.

No phantom is needed. The required filter sizes are derived from patient data. Only one reconstruction 24 is now required, plus one filtering operation, which is far less time-consuming than a second reconstruction.

In general terms, one embodiment of the invention provides a method of calibrating image data from a given medical imaging protocol, comprising: obtaining a visualization image by reconstruction of raw scan data 22 using a reconstruction 24 and applying a filter 30 to the visualization image, to generate a simulated reference image 32. The parameters of the filter 30 are determined from earlier comparisons of simulated reference image 32 with reference images 28 reconstructed from the corresponding raw scan data set by a standard reference standard reference reconstruction 24'.

This allows image data from any medical imaging protocol to be easily calibrated or checked against a standard for that image data. This could be a globally or regionally agreed standard for the image data, allowing repetition of results across different medical imaging protocols, such as different scanner types, or different methods of reconstruction.

This invention is concerned with validating a given imaging protocol and/or reconstruction against a standard reference reconstruction, and using this information to help interpret an image from the given protocol/reconstruction. It is applicable to a variety of reconstruction protocols (e.g. for different imaging modalities, such as PET, SPECT; for different reconstruction algorithms, such as OSEM).

Any regions of interest drawn on the visualization image may be propagated to the simulated reference image 28 for computation of quantification required for that region. The value returned in this case is labelled as SUVref—a standardised measurement of the SUV—which can then be presented alongside the image reconstructed as per the given protocol, or overlaid on the image.

In an alternative embodiment of this invention, as opposed to filtering the entire image 26 in order to compute SUVref measurements, a smaller region encompassing a region of interest (ROI) can instead be filtered. In this case, the simulated reference image 32 used for quantification is of the ROI only.

In another embodiment, a non-Gaussian—potentially, spatially non-uniform—filter can be used. This may better reflect the effects of differences in reconstruction on measured SUV. The image can also be processed using techniques other than filtering: the key element of the processing is to combine neighbouring uptake values. For example, a basic blurring effect, incorporating uptake values from neighbouring voxels, may be used.

The appropriate filter size $\sigma_p$ is derived for each patient 10. An average value of filter size is derived from these individual values for respective patients. The resulting average filter size may be regarded as an optimal filter size, and may be used to derive simulated reference images 32 from visualization images 26 of further patients. Patient filter sizes may be accumulated for generating the optimal filter size until a certain number of filter sizes have been calculated, or the filter sizes reach a certain criterion of variance; or another user-defined criterion. An optimal filter size may be calculated once per reconstruction protocol; and once per scanner type/software combination.

Figure 5:
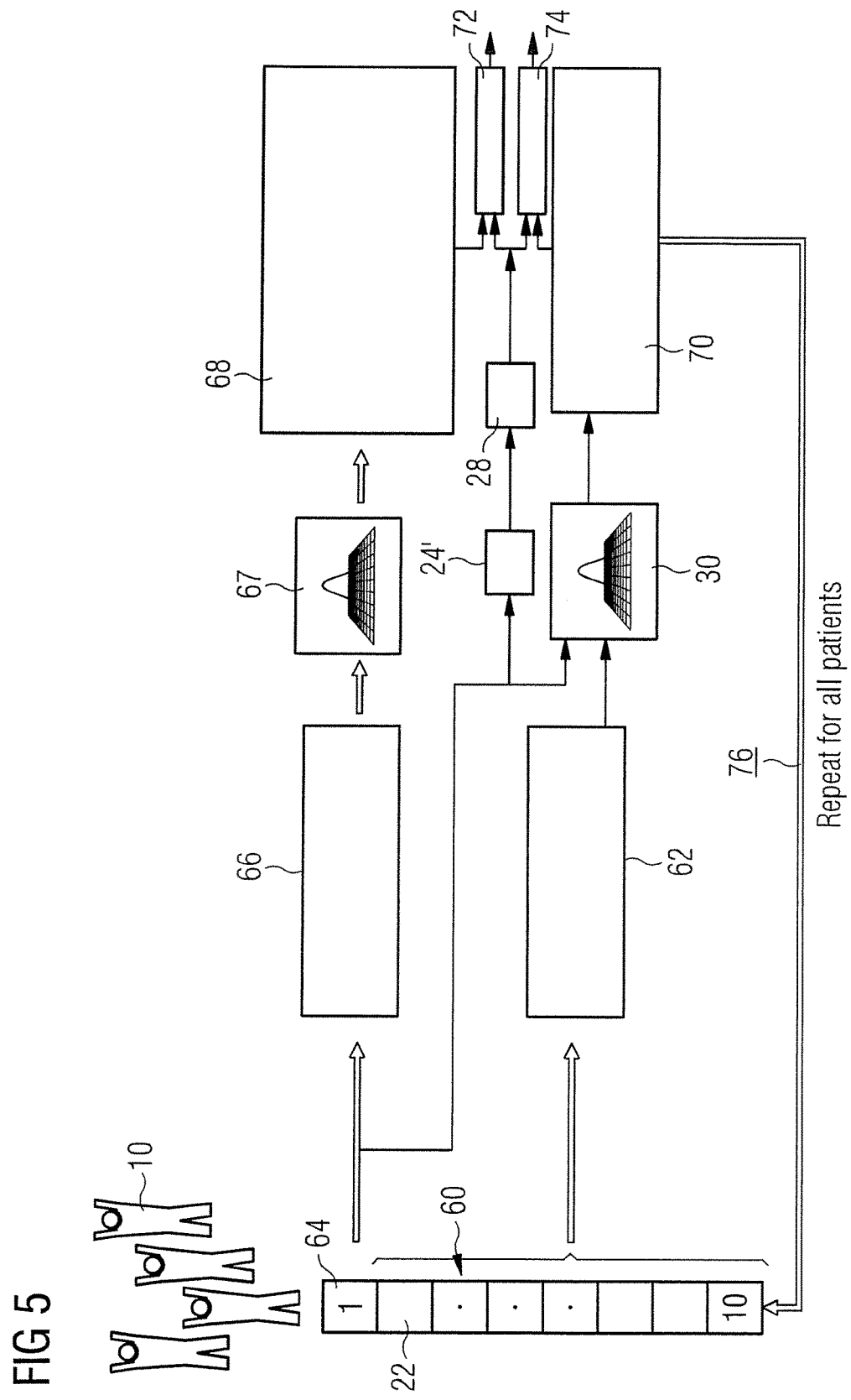
FIG. 5 shows a method which may be used to evaluate the results of a calibration according to the present invention.

FIG. 5 illustrates a cross-validation study which has been performed to evaluate the effectiveness of the present invention. From a set 60 of scan data sets 22 from ten respective scanned patients 10, nine of the scan data sets 22 are treated according to the invention as described above to arrive at a value of optimal filter size 62.

The scan data set 64 for the remaining patient is rendered according to a preferred protocol to provide a visualization image 66. The visualization image 66 is then filtered by a filter 67 derived using an image phantom, for example calculated as described in U.S. Pat. No. 8,755,574 and the equivalent GB2469569. A first simulated reference image 68 is thereby produced. In addition, the visualization image 66 is also filtered using the optimal filter size 30 obtained according to the present invention from the remaining scan data sets 22, as discussed above, to generate a second simulated reference image 70.

Figure 6:
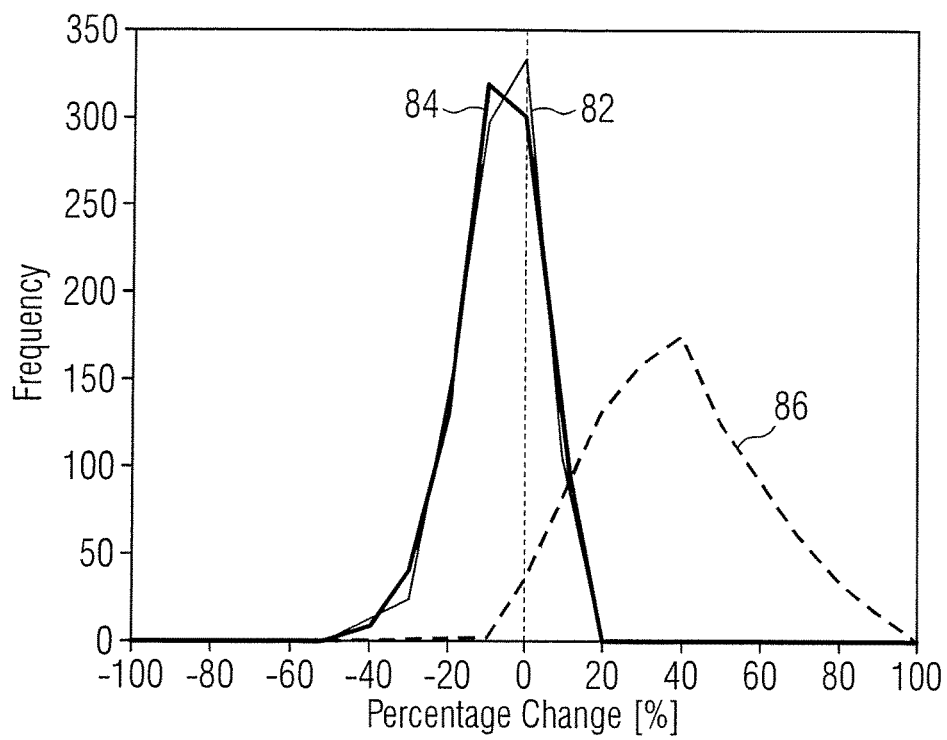
FIG. 6 shows a frequency plot of changes in data values after calibration according to the present invention; after calibration according to a known alternative calibration method; and without calibration.

The first and second simulated reference images 68, 70 were then respectively compared 72, 74 to reference image 28 generated from the same patient scan data set 64 reconstructed using the "reference" protocol 24'. Results of these comparisons are illustrated in FIG. 6 as a distribution of percentage change in SUVmax values between simulated reference images 68, 70, as well as visualization image 66, and reference image 28 data reconstructed using the reference protocol 24'.

The comparisons were carried out by comparing SUVmax values in regions of interest representing a sample of two to five lesions per patient in the simulated reference images 68, 70 to corresponding SUVmax values of the same lesions derived from images 28 reconstructed using the "reference" protocol 24'.

The comparison method illustrated in FIG. 5 may be repeated 76, selecting each time a different one 64 of the scan data sets 22 to be applied to phantom-derived filter 67 and to patient-derived filter 30 obtained according to the present invention from the remaining scan data sets 22. The results of the comparison, illustrated in FIG. 6, shows strong agreement between frequency of values of % change in SUVmax (x-axis) for phantom-based calibration shown in curve 82 and patient-data-based calibration according to the present invention, shown in curve 84. Curve 86 represents frequency of values of % change in SUVmax (x-axis) values for reconstruction comparing the quantification results (SUVmax) in a lesion for two different conventional "preferred" reconstruction protocols with no calibration.

Figure 7:
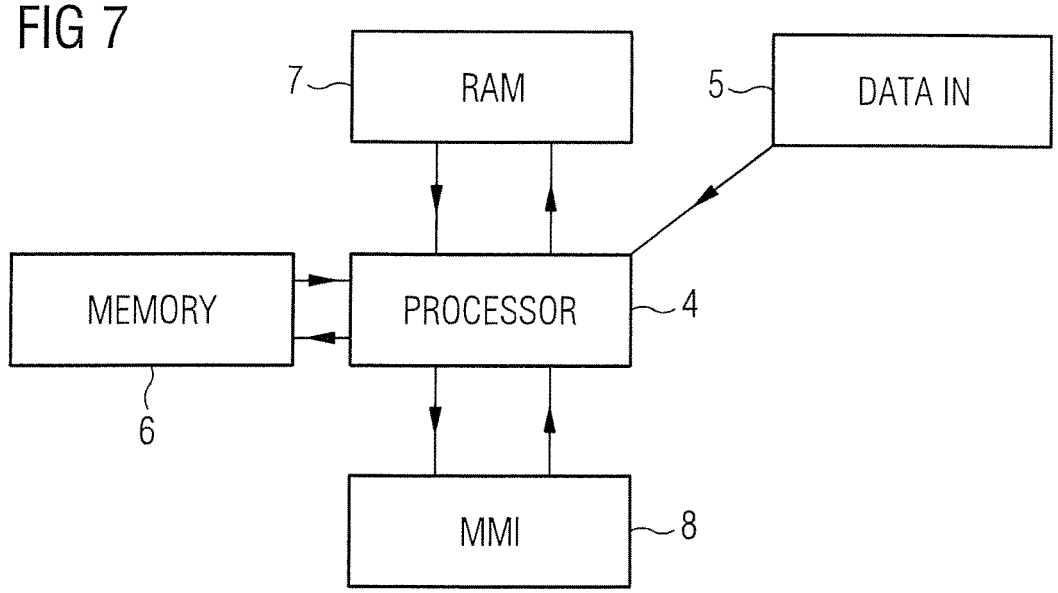
FIG. 7 shows a schematic representation of apparatus according to an aspect of the present invention.

Referring to FIG. 7, the above embodiments of the invention may be conveniently realized as a computer system suitably programmed with instructions for carrying out the steps of the methods according to the invention.

For example, a central processing unit 4 is able to receive data representative of medical scans via a port 5 which could be a reader for portable data storage media (e.g. CD-ROM); a direct link with apparatus such as a medical scanner (not shown) or a connection to a network.

Software applications loaded on memory 6 are executed to process the image data in random access memory 7.

The processor 4 in conjunction with the software can perform the steps such as comparing simulated reference images 32 with the corresponding reference images, in the step labelled 34 in the drawings.

A Man—Machine Interface 8 typically includes a keyboard/mouse/screen combination which allows user input such as initiation of applications and a screen on which the results of executing the applications are displayed.

Although modifications and changes may be suggested by those skilled in the art, it is the intention of the inventor to embody within the patent warranted hereon all changes and modifications as reasonably and properly come within the scope of his contribution to the art.

We claim as our invention:

1. A method for reconstruction of scan image data for visualization and for quantification comprising: providing a processor only with raw scan data acquired from a current patient, and in said processor reconstructing the raw scan data, using a first reconstruction protocol, into a visualization image; in said processor, applying a filter to the visualization image, to obtain, without another reconstruction, a simulated reference image for quantification, using a value of a filter parameter, which is adapted in said processor so as to be specific for the current patient, provided to the filter; in the processor, adapting the value of the filter parameter in order to produce an adapted value of the filter parameter that is specific for the current patient by: (a) providing an initial value of the filter parameter; (b) accessing a previously reconstructed reference image suitable for quantification, which was reconstructed using a second reconstruction protocol that is different from said first reconstruction protocol, from scan data, selected from the group consisting of scan data that are unique to said current patient and scan data averaged over a patient population of patients comparable to said current patient, acquired before the raw scan data used in said first reconstruction protocol; (c) comparing image-derived properties of the reference image and the simulated reference image, to obtain a comparison result; (d) adapting the initial value of the filter parameter according to the comparison result to reduce differences in the image-derived properties of the simulated reference image with respect to the reference image, and thereby producing said adapted value of the filter parameter; and (e) electronically storing the adapted value of the filter parameter for re-use with a subsequent scan of the current patient.

2. A method according to claim 1, comprising applying the filter to the visualization image by convolving image data of the visualization image with the filter according to the provided value of the filter parameter.

3. A method according to claim 2, comprising using a Gaussian filter as said filter, and wherein the filter parameter is a Gaussian kernel size.

4. A method according to claim 2, comprising using a Gaussian filter as said filter, and wherein the filter parameter is a full width at half maximum of the Gaussian filter.

5. A method according to claim 1, comprising comparing the image-derived properties of the simulated reference image with respect to the reference image as a voxel-by-voxel RMS error calculation.

6. A method according to claim 1, comprising iteratively performing (c) and (d) by, in each iteration, generating the simulated reference image that is used in (c), by applying said filter, with the adapted value of the filter parameter produced in (d) in an immediately preceding iteration, to the visualization image.

7. An apparatus for reconstructing scan image data for visualization and for quantification, said apparatus comprising:
 a processor provided only with raw scan data acquired from a current patient;
 said processor being configured to reconstruct the raw scan data, using a first reconstruction protocol, into a visualization image;
 said processor being configured to apply a filter to the visualization image to obtain, without another reconstruction, a simulated reference image for quantification, using a value of a filter parameter, which is adapted in said processor so as to be specific for the current patient, provided to the filter;
 said processor being configured to obtain the value of the filter parameter in order to produce an adapted value of the filter parameter that is specific for the current patient by:
 (a) providing an initial value of the filter parameter;
 (b) accessing a previously reconstructed reference image suitable for quantification, which was reconstructed using a second reconstruction protocol that is different from said first reconstruction protocol, from scan data, selected from the group consisting of scan data that are unique to said current patient and scan data averaged over a patient population of patients comparable to said current patient, acquired before the raw scan data used in said first reconstruction protocol;
 (c) comparing image-derived properties of the reference image and the simulated reference image, to obtain a comparison result;
 (d) adapting the value of the filter parameter according to the comparison result to reduce differences in the image-derived properties of the simulated reference image with respect to the reference image, and thereby producing said adapted value of the filter parameter; and
 (e) electronically storing the adapted value of the filter parameter for re-use with a subsequent scan of the current patient.

8. A non-transitory, computer-readable data storage medium encoded with programming instructions, said storage medium being loaded into a processor provided with scan image data from an examination subject, and said programming instructions causing said processor to:
 receive only raw scan data acquired from a current patient;
 reconstruct the raw scan data, using a first reconstruction protocol, into a visualization image;
 apply a filter to the visualization image to obtain, without another reconstruction, a simulated reference image for quantification, using a value of a filter parameter, which is adapted in said processor so as to be specific for the current patient, provided to the filter;
 adapt the value of the filter parameter in order to produce an adapted value of the filter parameter that is specific for the current patient by:
 (a) providing an initial value of the filter parameter;
 (b) accessing a previously reconstructed reference image suitable for quantification, which was reconstructed using a second reconstruction protocol that is different from said first reconstruction protocol, from scan data, selected from the group consisting of scan data that are unique to said current patient and scan data averaged over a patient population of patients comparable to said current patient, acquired before the raw scan data used in said first reconstruction protocol;
 (c) comparing image-derived properties of the reference image and the simulated reference image, to obtain a comparison result;
 (d) adapting the value of the filter parameter according to the comparison result to reduce differences in the image-derived properties of the simulated reference image with respect to the reference image, and thereby produce said adapted value of the filter parameter; and
 (e) electronically storing the adapted value of the filter parameter for re-use with a subsequent scan of the current patient.

\* \* \* \* \*